United States Patent [19]

Mathews, Jr., deceased et al.

[11] 4,179,586

[45] Dec. 18, 1979

[54] SYSTEM OF ENCODED SPEECH TRANSMISSION AND RECEPTION

[75] Inventors: Mitford M. Mathews, Jr., deceased, late of Silver Spring, Md., by Georgina H. Mathews, executrix; Thomas E. Tremain, Laurel; Myron T. Zmurko, Bowie, both of Md.

[73] Assignee: The United States of America as represented by the Secretary of the Army, Washington, D.C.

[21] Appl. No.: 277,211

[22] Filed: Aug. 2, 1972

[51] Int. Cl.² ............................................. H04K 1/00
[52] U.S. Cl. ........................... 179/1.5 R; 179/15 AP; 179/15 BY; 324/77 R; 364/827
[58] Field of Search ......... 179/1.5 R, 15 BM, 15 AP, 179/15 BC, 15 BY; 178/22; 324/77 R; 364/827

[56] References Cited

U.S. PATENT DOCUMENTS

| | | | |
|---|---|---|---|
| 3,204,034 | 8/1965 | Ballard et al. | 179/15 BC |
| 3,435,147 | 3/1969 | Malm | 178/50 |
| 3,488,445 | 1/1970 | Chang | 179/15.55 |
| 3,507,980 | 8/1970 | Rugaber et al. | 179/1.5 R |
| 3,688,193 | 8/1972 | McDonald | 179/1.5 R |
| 3,707,680 | 12/1972 | Gabbard et al. | 179/15 AP |

Primary Examiner—Howard A. Birmiel
Attorney, Agent, or Firm—John R. Utermohle

[57] ABSTRACT

A system for the secure transmission and reception of information which utilizes pseudo values of phase and amplitude of speech signals, which are related to the original values by specific algorithms. These pseudo values of phase and amplitude are encrypted separately and then transmitted. A similar system is used to process the received signals to obtain the original information.

17 Claims, 3 Drawing Figures

SYSTEM OF ENCODED SPEECH TRANSMISSION AND RECEPTION

BACKGROUND OF THE INVENTION

This invention relates broadly to the signal processing art, and more specifically to a system of secure transmission of information. The invention also has its applicability in any field where a high-speed-data transmission is desirable. A long existing problem in the communication art has been the requirement for a high-speed-data-transmission system, which is as secure as possible, particularly where speech is the type of data being transmitted. Along with the requirement of speed and security, the received data must be as similar to the original, and hence as recognizable to the receiver of the information, as possible. It is the attempt to maximize the solution to the problems of speed, security and recognition that has been responsible for so much effort in the communication arts, particularly in the recent past. Recently, however, with the advent of and increased use of computers and sophisticated vocoders, the need for better solutions to these problems has been intensified. Typical efforts along this line are shown in U.S. Pat. Nos. 3,435,147 to Malm, and 3,488,445 to Chang. These patents are merely illustrative of the general effort in this area of technology and represent the most pertinent references the inventor has been able to discover. There are many other patents and publications which deal extensively with problems and various solutions in this particular area of data communications, particularly in the area of secure communications. The present invention represents a significant advance in the state-of-the-art over previous solutions to those problems mentioned and discussed above. The present invention significantly increases the speed and the security of data communications, while maintaining a high data recognition standard at the receiving end of the transmission.

This invention, moreover, is designed to utilize existing data communication links, in particular the existing telephone lines of the telephone system of the United States. By adjusting various parameters, the operation of the invention can be matched with the characteristics of the transmission line to provide a high-speed, secure and recognizable data transmission.

SUMMARY OF THE INVENTION

An object of the present invention is to significantly increase the absolute speed at which data, including speech, may be transmitted over existing transmission lines.

Another object of the invention is to maintain a high level of security for the transmission of data information.

A further object of the invention is to provide a high-speed, secure means of data communications, including speech, which utilizes existing transmission lines.

A still further object of this invention is to provide a high-speed secure means of information transmission, while maintaining a high level of data recognition.

With these and other objects in mind, the invention first transforms incoming information, for instance, ordinary speech, into a digital representation, and then utilizes the digitized version of the incoming information to obtain pseudo or false values of amplitude and phase of such signals, the pseudo values being related to the actual phase and amplitude values of the signal by known algorithms. The invention then routes the pseudo values of phase and amplitude in separate signal paths and encrypts the pseudo values separately. These encrypted values of amplitude and phase are then used to modulate a number of stored carrier tones. These modulated tones are then combined with other information into a single signal stream with a portion repeated to provide time guard range and transmitted over existing transmission lines, the tones being matched with the transmission line characteristics. Upon receipt of this transmitted information, the receiver then processes the data to obtain the original information.

Other objects and many of the other attendant advantages of this invention will be readily appreciated as the invention is better understood by reference to the description below, when taken in conjunction with the following diagrams wherein.

THE PREFERRED EMBODIMENT

Figure 1:
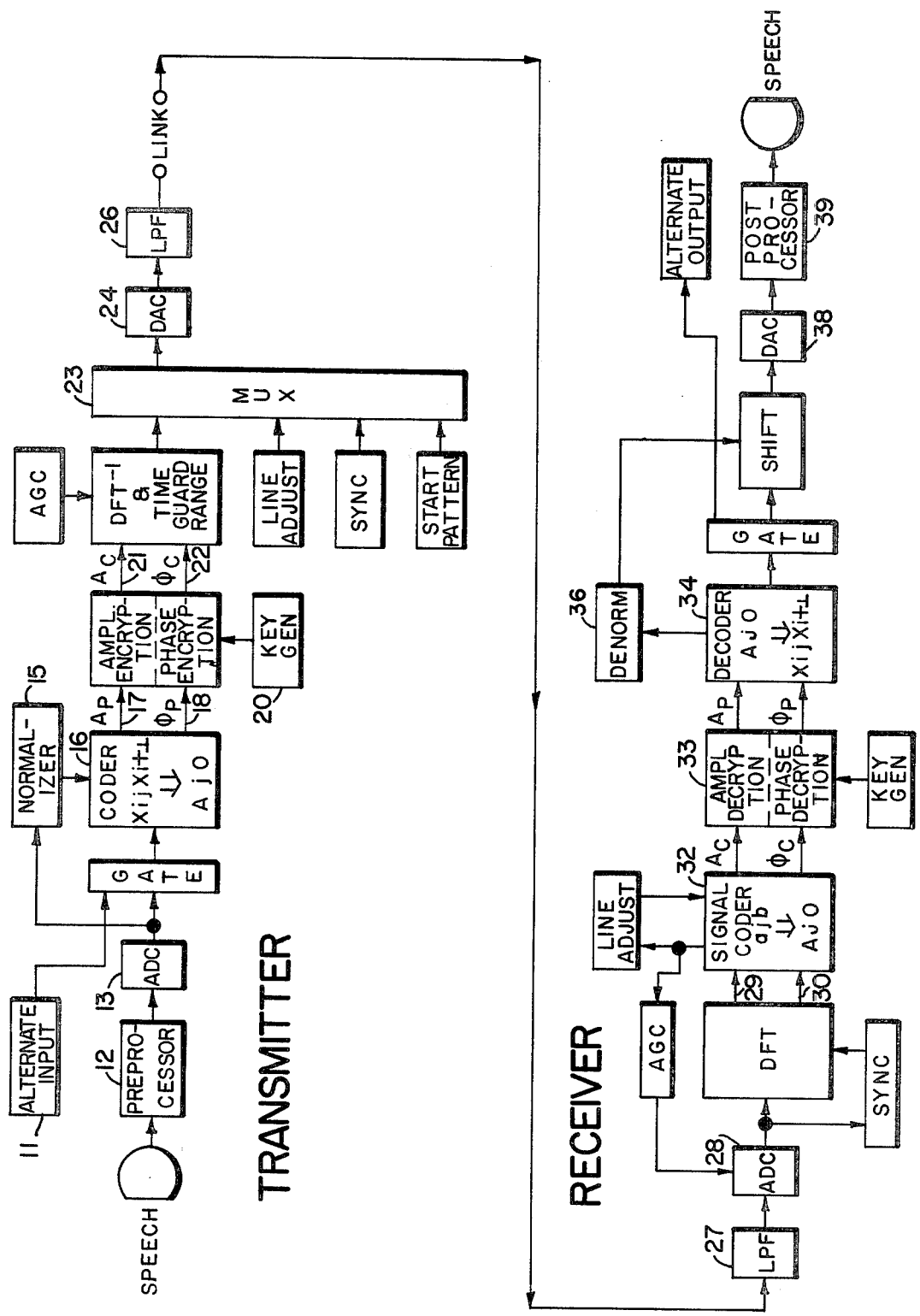
FIG. 1 is a generalized diagram of the invention system.

FIG. 1 shows a generalized block diagram of the entire system of the invention, including the transmitter portion of the invention, the transmission line or link, and the receiver portion of the invention. Ordinary speech is converted by the transmitter portion of the invention into a modulated multiplexed signal stream that is passed over the transmission line and which is received at the other end and reconverted to normal speech by the receiver. The receiver, for the most part, is a mirror image of the transmitter with some minor variations. It should be noted at the outset of the description of the preferred embodiment of the invention that none of the blocks or functions of the individual blocks shown in FIG. 1 is particularly novel in itself. Each one of the functions are individually recognized in the art and have been used before in some application, although not always in the communications arts. The actual invention lies in the unique combination of the various parts to produce a result which has outstanding advantages over the prior art, as more fully described in the preceding paragraphs.

With this in mind, FIG. 1 shows the basic configuration of the invention and serves as an introduction to a general understanding of the invention. Ordinary speech is used most frequently as an input to the invention, although an alternate input 11 is available for other than ordinary speech, such as other kinds of data information. If ordinary speech is used, it first is handled by a pre-processor 12 which limits the input speech signal to that particular frequency range that matches the capability of the analog-to-digital converter, which is the succeeding equipment to the pre-processor. The analog-to-digital converter 13 transforms the normal analog speech signal into a series of representative digits. Since the transmitter operates on digital principles, it is first necessary to convert normal analog speech into its appropriate digital representation. This may be accomplished by any standard analog-to-digital converter and an appropriate filter which limits the frequency of the incoming analog speech signal to that particular frequency range which the analog-to-digital converter is capable of processing. If the data to be transmitted is already in a digital form, it is not necessary to use a pre-processor or an analog-to-digital converter. An alternate input is provided for this purpose.

The digital signal then is inputed into an equipment known as a normalizer 15 which is a variable gain device. The normalizer is a level detector, which determines the maximum absolute value of the digitized speech per frame, and then reduces the number of possible levels in the signals. After the input signal has been normalized, it is used as an input to a coder 16. The coder operates on successively sampled pairs of the normalized input signal and transforms the signal into pseudo amplitude and pseudo phase values. From the successively sampled normalized values the operation of the coder results in two different signals, one known as the pseudo amplitude and the other as the pseudo phase value of the original digitized input signal. These signals are achieved by using two different algorithms, one algorithm to originate the amplitude values, and the other algorithm to originate the phase values. The algorithm utilizes the normalized sampled digits as variables to attain amplitude and phase signal streams which appear on conductors 17 and 18, respectively. These signals are thus related to the normalized digital signals by the algorithms used in the coder. These algorithms will be more fully described later.

The amplitude and phase signal streams are then separately encrypted with key digits. Many functions are accomplished in the encryption process, but the actual encryption is accomplished using a modular addition of a key variable, which is originated by a standard key generator 20. Again, the particulars of the encryption process will be more fully discussed in succeeding paragraphs. The encrypted amplitude and phase signal streams 21 and 22 are then inputed to an inverse discrete Fourier transform block, where the amplitude and phase encrypted digits are utilized to modulate a number of carrier frequencies in a specific frequency range. The output from this block is a single signal stream comprised of successively modulated carrier frequency tones. The individual tones are stored and are called out sequentially, the amplitude signal stream and the phase signal stream then modulating these individual tones. The tones themselves vary in frequency by some selected differential, resulting in a significant frequency difference between the first and last tone used.

The output of the inverse discrete Fourier transform is then multiplexed with control and message information in a multiplexer 23 and then sent to a digital-to-analog converter 24, which transforms the multiplexed digits into a representative analog signal for subsequent transmission. Lastly, a low pass filter 26 restricts the analog output signal to a specified frequency range for transmission. This analog signal is then transmitted over the selected transmission line. At the other end is the receiver portion of the invention, which utilizes many of the same principles as the transmitter, arranged of course in a slightly different fashion. At the front end of the receiver, referring again to FIG. 1, there is a low pass filter 27 which limits the signal to the appropriate bandwidth for the receiving equipment. There is also another analog-to-digital converter 28 which again samples the received analog signal and which results in a digital representation of the transmitted analog signal. A discrete Fourier transform is then performed on the digital information, which demodulates the signal into real and imaginary signal streams 29 and 30.

These signals are then put into a signal coder 32 which transforms the components of the signal into amplitude and phase numbers. These signals are then separately decrypted, in a device 33, and the plain text amplitude and phase digits are recovered. The plain text values of amplitude and phase are then decoded to recover original sampled digital numbers. The decoder 34 takes the amplitude and phase values which are related to the original sampled digital speech and removes the algorithm which was responsible for the original pseudo phase and pseudo amplitude values. Thus, the original speech signals, although still normalized and digitized, are now present. This signal then is denormalized by a denormalizer 36, which restores the digital signals to their original values, and the signal is then applied to a digital-to-analog converter 38 which restores the signals to their analog form. A post processor 39, which limits the recovered speech to a specified frequency bandwidth, completes the receiver. The speech is now ordinary speech, and is a facsimile of the original speech which was used as an input to the transmitter portion of the invention.

Figure 2:
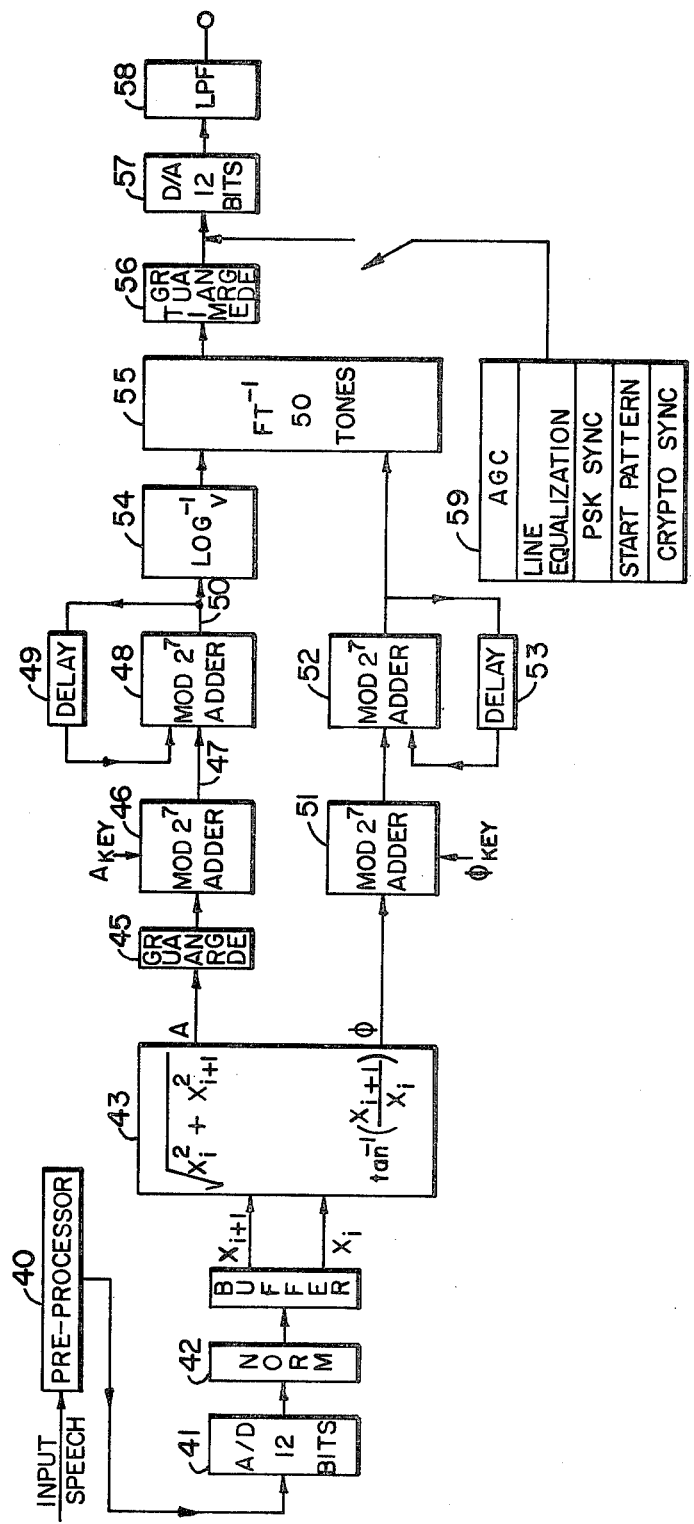
FIG. 2 is a diagram of the transmitter portion of the invention.

Referring to the invention in more detail in FIG. 2, a pre-processor 40 consists of a low pass filter having a bandwidth of 0–1920 hertz, an eighth order eliptic filter with a slight pre-emphasis to give a good tonal quality to the received speech. The filter has a distinctly sharp and fast cut-off, the 3 db down-point occurring at approximately 1830 hertz, and the 40 db down-point at approximately 1920 hertz. The pre-emphasis begins at approximately 800 cycles and rises about 10 db before beginning the sharp cut-off. The pre-emphasis is not essential to the operation of the invention, but is only included to make the recovered speech slightly less bassy in tone. The pre-emphasis accentuates the higher frequencies in the bandwidth and thus puts more emphasis on the treble tones, rather than the bass tones of the recovered speech.

From the low pass filter 40, the signals are applied to an analog-to-digital converter 41. The analog-to-digital converter is standard and does not have any special features. It is a linear 12-bit, pulse-code-modulated (PCM) coder, having a sampling rate of 3840 hertz. The output of the analog-to-digital converter is a digitized version of the analog voice signal which was applied to the pre-processor 40. At this point, the ordinary speech which was the input to the low pass filter, has now been limited to a frequency bandwidth of 0 hertz to approximately 1920 hertz, digitized with a sampling rate of 3840 hertz. This digitized speech is then inputed into a device known in the speech communication art as a normalizer 42.

The input to the normalizer 42 is 12 bit numbers from the analog-to-digital converter 41, comprised of a sign bit plus 11 numerical bits. Thus there are $2^{11} - 1$ discrete levels of information utilized as input from the converter 41 to the normalizer 42. The normalizer is, in essence, a variable gain device which operates on a frame-by-frame basis in time. It reduces the number of discrete levels of information to a more manageable level, such level being utilized in other parts of the invention. The typical frame-time length utilized in this invention (with a sampling rate of 3840 hertz) is 25 milliseconds with 96 discrete speech samples per frame. Each one of these samples (from the converter 41) is a discrete 12-bit number, thus resulting in 2047 discrete levels possible per sample. A normalizer, utilizing principles of variable gain, reduces each sample to a 6-bit plus-sign number, thus resulting in 63 possible levels in the numerical samples, in both the plus and minus directions.

The normalizer 42 utilizes 6 gain levels: 1, 2, 4, 8, 16 and 32. On a sample-by-sample basis, the normalizer 42 applies one of these 6 gain levels to each speech sample in a particular frame. For those samples with a rather high numerical level, the lower gain levels are used; for those samples having a low initial numerical level, a high gain level is used. For instance, if the absolute value of the maximum original sample group is less than 2047 or greater than 1023, a gain of 1 is used; if the original sample is less than 1024 but greater than 511, a gain of 2 is used; and if the sample is less than 512 but greater than 255, a gain of 4 is used, and so on until a gain of 32 is utilized for the smallest numerical levels. This normalizing technique compresses the differences between the individual speech samples, while retaining the quality of the original speech. The number of speech levels are decreased through the use of 7-bit rather than 12-bit numbers to represent the digital samples, thus going from 2047 discrete levels to 63 discrete levels, both in the plus and minus direction. The 7-bit word does not significantly decrease the quality of the speech to be transmitted and recovered in the invention.

The output of the normalizer 42 is then used as an input to a coding device 43. The output of the normalizer, (in the form of digitized speech samples, the gain of which is normalized) is used as an input to the coder of the invention. The coder performs a rectangular-to-polar transformation and utilizes algorithms to convert normalized speech into pseudo amplitude and pseudo phase values. By the use of 2 algorithms, 1 algorithm for the amplitude path and another algorithm for the phase path, the real values of speech are converted into pseudo values of amplitude and phase, for speech processing purposes. It will be remembered that the invention operates on a frame-by-frame basis, the time duration of a single frame consisting of 25 milliseconds, containing 96 discrete speech samples. These speech samples are then transformed into pseudo phase and pseudo amplitude values. The algorithm that is used to convert the samples into amplitude values for the amplitude path is: $A_n = \sqrt{x_i^2 + x_{i+1}^2}$ There are 48 separate discrete pseudo amplitude values for each frame, as the above equation indicates. The speech samples ($x_i$=the numerical value of the designated sample) utilized are alternating samples, i being successively equal to 1, 3, 5, 7, 9, etc. The use of this formula will result in amplitude ($A_n$) values which result in 48 discrete amplitude values per frame.

The algorithm utilized in transforming the real speech samples into pseudo phase values is: $\Phi_n = \tan^{-1}(x_i + 1/x_i)$ Again, the individual samples ($x_i$ in the formula) are alternating samples, 1, 3, 5, 7, etc. The use of this algorithm will result in 48 discrete pseudo phase values per frame. In relation to both the pseudo amplitude and pseudo phase values, it is emphasized that they are utilized for simplicity of processing only, and that they are functionally related to the actual speech signal from the normalizer 42. The output of the coder is now in the form of two signal paths, one signal path containing 48 pseudo values of amplitude per frame, and the other path containing 48 pseudo phase values per frame. These two signals are then encrypted, as will now be described.

In the encryption process, the pseudo amplitude signal values are encrypted separately from the pseudo phase signal values. Since the amplitude encryption utilizes a modulo type of addition, it is necessary to use a guard range device 45 before the actual encryption, to prevent significant errors from occurring under certain circumstances in the decryption process. To describe the function of the guard range device 45, it must be known that the modulo type of addition may result in a "fold over" in the receiver due to received transmission-line noise. Modulo 128 addition is utilized in the encryption process so that the actual numbers or levels go from 0 to 127. In modulo 128 addition, if one adds a 1 to 127, the result is a 0. If noise enters the system at any particular point, it may cause significant errors in the system if extremely small numbers or very large numbers are involved. If this occurs, the signal will fold over on itself and cause a significantly large error in the received signal. For instance, if a digital signal with an amplitude of 5 were initially transmitted and the noise in the system caused an error of minus 7, it is obvious that the received signal, because of the possible fold over, might appear to be 126, which would be a substantial error.

To prevent this fold over, a "guard range" of 25 is used. The guard range device 45 is then a standard adder which adds a constant numerical value of 25 to the pseudo amplitude numerical values to be encrypted. Since the maximum digital amplitude single numerical value that can exist (in the described system) is $x_i = 63$, it follows that the maximum pseudo amplitude value (through use of the appropriate algorithm) is $63\sqrt{2}$, or approximately 89. Adding 25 to this maximum value would give an absolute maximum of 114, which is well under the fold over value of 128. To prevent this possible fold over of the signal, an absolute numerical value of 25 is added to each pseudo amplitude number being encrypted, the range of possible numbers now being 25 through 114, instead of 0 through 89. In the encryption of the pseudo amplitude values, the output of the guard range adder 45, which has been described above, is used as an input to a standard modulo adder 46 which adds key signal to encrypt the pseudo amplitude signals. The preferred embodiment uses Modulo 128 encryption, which requires a Modulo $2^7$ adder. This equipment adds the key signal, which is originated by a standard key generator, to the pseudo amplitude signal. The output of this adder is a pseudo amplitude crypto signal designated in FIG. 2 by the numeral 47.

Another Modulo 128 adder 48 is used as a differential delay means. The output of this adder, designated by the numeral 50, is used as input to a shift register 49. The shift register has a 49-character capacity, and thus effectively delays the output of the Modulo 128 adder one frame (25 milliseconds). This delayed output is then fed back to the input of the adder 48. This process is known as differential amplitude coding and is used in the invention to remove constant amplitude differences introduced into the transmitted signals by slow changes in the amplitude characteristics of the transmission line. It is a compensating device for slow changes in the characteristics of the particular transmission line being used. The output of the Modulo 128 adder 48 is then used as an input to an inverse logger (expandor) 54. This inverse logger is present in the amplitude path to prevent having extremely small amplitude signal values on the line. It is possible that extremely small amplitude values would be distorted (i.e., by a poor signal-to-noise ratio) and where the amplitude value is 0, the phase value of the signal would be lost entirely. This approach involves taking an inverse log function of the amplitude signal according to the formula: $A_L=4(A_{in}/127)-1$ where $0 \leq A_{in} \leq 127$. Taking a log function of the amplitude signals insures that sufficient amplitude of the individual signals will be present.

The encryption of the pseudo phase signals, as compared to the encryption of the pseudo amplitude signals, is relatively simple. No guard range is used, since in polar coordinates the values of the sine and cosine of small angles are very close to the sine and cosine values of large angles (those close to 360°). A small error thus will remain a small error and no guard range is necessary. The pseudo phase values from the coder 43 are used as an input to a Modulo 128 adder 51 for the addition of the key to produce encrypted signals. As in the amplitude path, a standard key generator supplies the key signal which is added to the pseudo phase values produced by the coder. In addition, the phase signal path, as in the amplitude signal path, utilizes a second Modulo 128 adder 52, in conjunction with a shift register 53, to accomplish differential phase encoding. The output from the second Modulo 128 adder 52 is delayed one frame length (25 ms) by the shift register 53 and fed back to the Modulo 128 adder 52. Again, the differential phase encoder is used to compensate for slow changes in the characteristics of the transmission line which will effect the phase of the transmitted signal.

An inverse Fourier transform is then performed at 55 on both the encrypted amplitude and the encrypted phase signals to transform these signals from the frequency domain into the time domain. A standard summation function is performed according to the following formula:

$$\sum_{n=11}^{60} A_n \cos(n\omega_o t K + \Phi_n) K=1,2,...,128$$

The function $\omega_o$ is equal to $2\pi f_o$, where $f_o$ equals 50 hertz. In accomplishing this transformation, either a discrete Fourier transform or fast Fourier transform may be used. Many different kinds of implementation can be utilized here. It is only necessary to transform a set of encrypted amplitude values and a set of encrypted phase values into a time domain signal for the purposes of transmitting the signal over desired transmission line. The first 32 samples of the time signal from the Fourier transform 55 are repeated by a time guard range device 56. This is accomplished in a manner similar to that of the guard range device 45, as described above, and is performed to provide 5 milliseconds time protection of the transmitted signal against differential delay distortions that may be introduced by the transmission line.

The output of the time guard range device 56, which is a single signal stream, is then applied to a standard digital-to-analog converter 57 which has a sampling rate of 6.4 kilohertz. The analog output of the digital-to-analog converter is then passed through a low-pass filter 58 with a bandwidth of 0–3000 hertz. This low-pass filter is effective in removing the upper side-band of the pulse-amplitude-modulated signal resulting from the operation of the digital-to-analog converter. The output of the low-pass filter is then transmitted to the receiver portion of the invention through appropriate transmission media, for example telephone lines of the type currently in use. In addition to the actual transmission of speech, the invention also utilizes a "preamble" to every transmission, for the purposes of synchronization and line equalization between the transmitter, the transmission media, and the receiver. The preamble information is shown in block 59 in FIG. 2. Before each transmission, the transmitter will first transmit 11 frames of AGC amplitude information, these signals having a continuous phase. After the AGC information, the transmitter will transmit 10 frames of line equalization tones. These line equalization signals are also continuous phase and consist of 13 different tones, each tone being 200 hertz removed from the previous and succeeding tones.

After the line equalization tones, the transmitter will send 6 frames of a frame synchronization signal. This is a phase shift keyed signal, where the phase of the transmitted signal changes 180° every frame. At the time boundary lines of each frame, the signal will shift 180°. After the frame synchronization, the transmitter will send 3 frames of a start pattern, consisting of 5 selected tones of equal amplitude and selected phase. This start pattern is used to establish a start time for the processing of the speech in the receiver. After the start information, digital information is transmitted to synchronize the crypto key variables. After the crypto synchronization is accomplished, the transmission of the encrypted speech is begun. The encrypted, modulated speech is then transmitted over appropriate transmission media, preceded by the preamble information described above. At the receiver end of the invention, the transmission is received and the first operations that are performed are the proper synchronization of the operation of the receiver with that of the transmitter.

Figure 3:
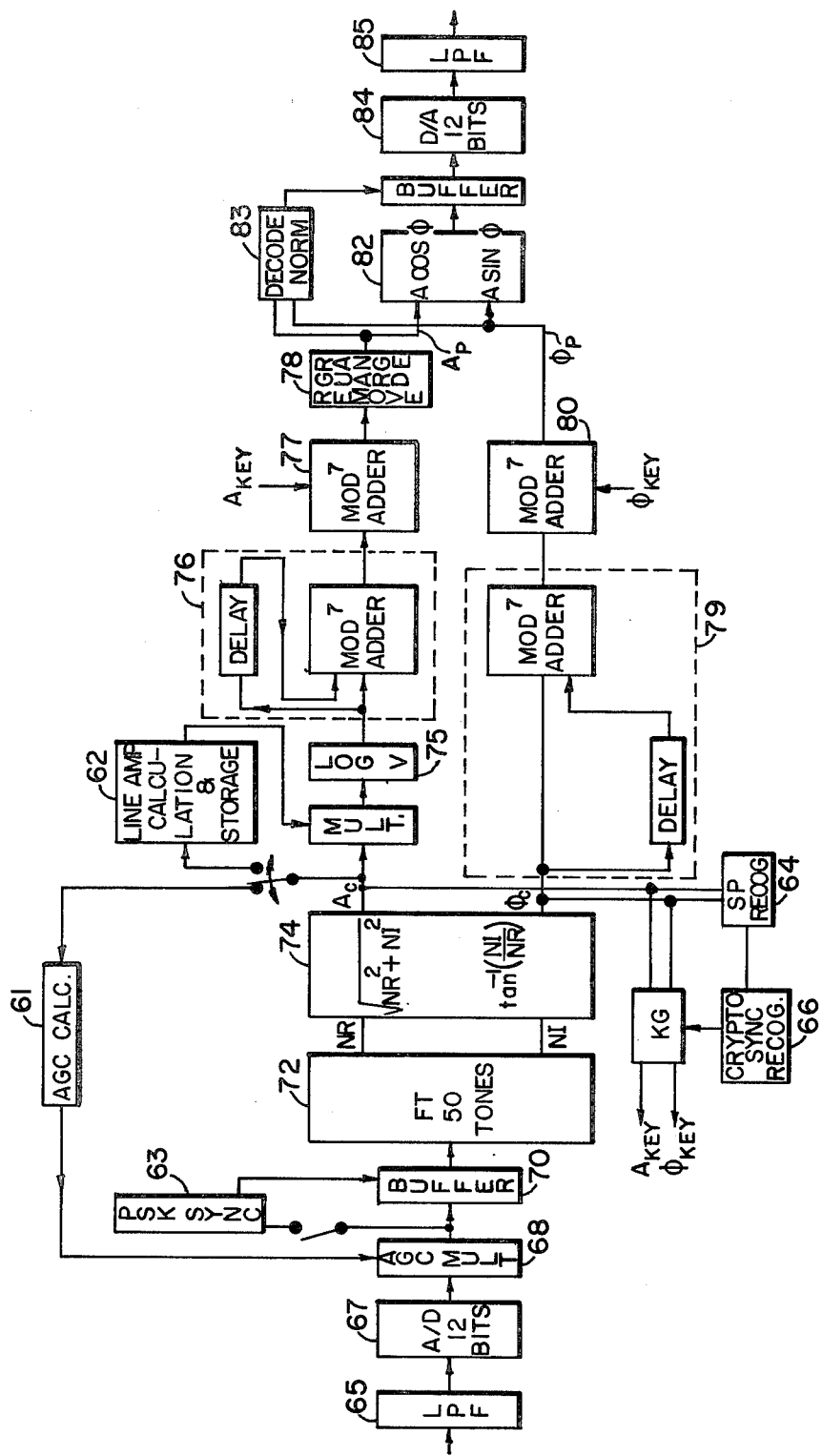
FIG. 3 is a diagram of the receiver portion of the invention.

FIG. 3 shows a block diagram of the receiver portion of the invention. The received signal includes all of the distortions introduced by the characteristics of the transmission media and significant attention is paid to the synchronization and line equalization problems. For the purpose of describing the invention, these processes will first be discussed, although they do operate at several different points in the receiver, as is made clear by a reference to FIG. 3. The receiver first recognizes that it is receiving a transmission when it recognizes the AGC signal sent by the transmitter. The receiver examines 128 samples of information at a time, out of the 160 sample frame lengths (25 ms frame length at 6.4 kh sampling rate) which are transmitted. An AGC calculator 61 examines the amplitude value of the AGC parameter which it has received and determines whether the number is sufficient to meet a specified threshold value. The calculator 61 requires that two successive 128 sample length frames yield amplitude values above the established threshold value. After these successive frames are recognized, the AGC correction for the line loss in transmission becomes effective, and any loss in signal strength due to the characteristics of the transmission media, if any, are compensated for through the use of the AGC circuits.

The line equalization function is performed by a structure designated by block 62. This utilizes the 13 tones for line equalization described above and compensates for the particular amplitude-frequency response of the transmission media. In any kind of transmission media such as a transmission line, some of the amplitude of specific frequency signals is lost due to the particular frequency response of the individual transmission line. The line equalization circuit utilizes the transmitted signals to determine the frequency response of the transmission line in use and then uses a mirror image frequency response curve to compensate the amplitude signal loss. A PSK synchronizer, as shown in block 63, is used to accomplish synchronization between the receiver and the transmitter in respect to the start time of a frame of information. As mentioned earlier, it uses a phase-shift-key technique (matched filter) known in the art where a detection of a null between the two signals indicates that proper synchronization has been achieved. Additionally, two more parts of the synchronization system, namely a start pattern recognizer 64 and a crypto sync recognizer 66 establish the start time and a crypto synchronization for the processing of the received speech.

Assuming that the previously described synchronization and equalization circuits, all of which are well known in the communications art and require no detailed explanation, are operating properly, the receiver will begin to properly process the encrypted speech which follows the preamble information. The transmitted speech is applied first to a low pass filter 65 shown in FIG. 3. It is a standard low pass filter having a bandwidth of approximately 0–3000 hertz. This frequency-limited signal is then applied to an analog-to-digital converter 67, a 12-bit PCM coder which has a sampling rate of 6.4 kh which is identical to the sampling rate of the digital-to-analog converter 57 at the output of the transmitter. The signal at this point is a digital representation of the encrypted transmitted signal. This signal is then routed to an AGC multiplier 68, the gain rate of which depends upon the operation of AGC calculator 61 which, as previously explained, operates in the standard AGC fashion to raise the amplitude of the received signal to compensate for amplitude losses in transmission. The output for the AGC multiplier 68 is then routed through a buffer 70 and the PSK synchronizer 63, the operation of which has been previously described. A Fourier transform, designed to convert the received signal from the time domain back into the frequency domain for processing, is then performed by a device 72 on the signal. This Fourier transform may either be a Discrete Fourier Transform (DFT) or a Fast Fourier Transform (FFT). As usual, it transforms the single signal into real and imaginary parts according to the following summations:

$$NR(m) = \sum_{n=1}^{128} f(nt)\cos(m\omega_0 nt);$$

$$NI(m) = \sum_{n=1}^{128} f(nt)\sin(m\omega_0 nt) \text{ for } m = 11,12,--,60$$

These real and imaginary values then undergo another transformation of coordinates from rectangular to polar in a device designated by the numeral 74. Therein the signal is converted to a real amplitude value according to the following formula: $A = \sqrt{NR^2 + NI^2}$ The imaginary part of the signal is then converted to a real phase spectrum of the received line signal according to the following formula: $\Phi = \tan^{-1}(NI/NR)$ The results of this transformation are real amplitude and real phase spectra of the transmitted signal. These real values are then processed separately in an inverse fashion from that followed in the transmitter. In the amplitude path, the received amplitude signal first is used as an input to a logger (compressor) 75 which is the inverse of the procedure performed on the signal in the transmitter where the inverse logger 54 functioned as an expandor. Likewise, the inverse of the differential amplitude encoding is performed by structure within dashed lines designated by the numeral 76 in FIG. 3. The crypto key is then removed or subtracted from the signal at this point by a Modulo 128 adder 77, and guard range which added the absolute value of 25 to the numerical pseudo amplitude samples is also removed by subtracting that same value from the received numbers by a device well known in the art and designated by the numeral 78. This inverse operation applies in the phase path as well. Both the differential phase decoding by a Modulo 128 adder and delay circuit, both designated by the numeral 79, and the decrypting by a Modulo 128 adder 80 are the inverse operations to those performed at the transmitter.

At this point, an inverse input transform is performed by circuitry designated by the numeral 82 on the plain text amplitude and phase values, which results in a single speech signal stream. This inverse input transform is performed according to the following formula:

$x_i = A_p(m) \cos \Phi_p(m); x_{i+1} = A_p(m) \sin \Phi_p(m)$ for $i = 1,3,5,--,95$ Then, the normalization process which was performed at the transmitter is removed by a decoding normalizer 83. As described above, the normalizer 83 is a variable gain device which is used to reduce the number of voltage levels in the digitized speech samples. Depending upon the actual amplitude level of the individual digital samples, a certain fractional gain which is the inverse of the gains applied at the transmitter is applied to the signals. Thus, for instance, the variable inverse gains would range from a high of 1 to a low of 1/32. This inverse normalization returns the digital samples to their original configuration. The output of the denormalization process is then routed to a digital-to-analog converter 84, which is a 12-bit decoder with a sampling rate of 3840 kh, identical to that used at the front end of the transmitter. The operation of the digital-to-analog converter 84 returns the processed speech back to analog form. The signal is then sent to a low-pass filter 85 having a bandwidth of 0 to 1920 hertz. The use of a low-pass filter here again eliminates the upper sideband which is a result of the digital-to-analog converter. The processed speech is now completely intelligible and is in fact very nearly identical in tonal quality to the original speech.

It is to be understood that the above described embodiment of the invention is merely illustrative of the principles thereof and that numerous modifications and embodiments of the invention may be derived within the spirit and scope thereof.

What is claimed is:

1. A system of information transmission and reception comprising:
   means for obtaining values for amplitude and phase of a digital information signal, the values being related to the original amplitude and phase by predefined algorithms;
   means for separately routing said values in separate signal paths;
   means for transforming the information in said signal paths from the frequency domain into the time domain;
   means for modulating a number of carrier tones with the information in said signal paths, the output of said modulating means being suitable for transmission, and
   receiving means for recovering the original digital information.

2. A system of information transmission according to claim 1, including a low pass filter at the beginning of the system to limit the range of frequencies to be processed.

3. A system of information transmission according to claim 2, wherein the algorithm used for a first signal path is:

$$A = \sqrt{x_i^2 + x_{i+1}^2}$$

4. A system of information transmission according to claim 3, wherein the algorithm used for a second signal path is:

$$\Phi = \tan^{-1}(x_{i+1}/x_i)$$

5. A system of information transmission according to claim 4, including means for compensating for the distortions in the signal caused by the characteristics of the transmission media.

6. A system of information transmission according to claim 5, including means for separately encrypting the information in each of said signal paths.

7. A system of information transmission according to claim 6, including guard range means on said first signal to prevent the fold over of the information signal during the processing of the information.

8. A system of information transmission according to claim 7, wherein said transformation of information is implemented by a Fourier transformation.

9. A system of information transmission according to claim 8, wherein the modulating means includes a specified number of tones, said tones being regularly separated in frequency from 0 hertz to not greater than 4000 hertz.

10. A system of information transmission according to claim 9, wherein said guard range means includes a means for adding a constant value to said digital information values, said guard range means operative upon said digital information before the operation of said encrypting means.

11. A system of information reception according to claim 1, comprising:
means for recovering the amplitude and phase spectrums of the received signal; said amplitude and phase spectrums being related to the amplitude and phase spectrums of the original information to be transmitted by algorithms;
means for routing said recovered spectrums in separate signal paths, and
means for removing said algorithms from each of said signal spectrums.

12. A system of information reception according to claim 11, wherein the means for recovering the amplitude and phase spectrums of the received signal includes
means for performing a Fourier transform of the received signal, and
means for transforming the Fourier coefficients into their corresponding amplitude and phase spectrums.

13. A system of information reception according to claim 12, wherein the means for removing said algorithms includes means for transforming the recovered amplitude and phase parameters of the received signal to a single signal by means of the following equation:

$$x_i = A_{pi} \cos \Phi_{pi}$$

$$x_{i+1} = A_{pi} \sin \Phi_{pi}$$

14. A system of information reception according to claim 13, including means for removing the guard range values added to the signal by the transmitter.

15. A system of information reception according to claim 14, including
means for synchronizing the operation of the receiver with the operation of the transmitter, said synchronizing means including automatic gain control,
means for equalizing the amplitude spectrum loss introduced by the transmission line, and
means for establishing a time zero to denote the start of information processing in the receiver.

16. A system of information reception according to claim 15, including means for separately decrypting the amplitude and phase signals in their respective signal paths.

17. A system of information reception according to claim 16, including
at least one low pass filter to limit the received information to the transmitted bandwidth, and
at least one analog-to-digital converter, to transform the frequency limited received signal into digital form for processing by the receiver.

* * * * *